(12) United States Patent
Mori et al.

(10) Patent No.: US 6,513,979 B2
(45) Date of Patent: Feb. 4, 2003

(54) HYDRODYNAMIC OIL-IMPREGNATED SINTERED BEARING UNIT

(75) Inventors: Natsuhiko Mori, Kuwana (JP); Tetsuya Kurimura, Kuwana (JP)

(73) Assignee: NTN Corporation, Osaka-fu (JP)

( * ) Notice: Subject to any disclaimer, the term of this patent is extended or adjusted under 35 U.S.C. 154(b) by 6 days.

(21) Appl. No.: 09/912,438

(22) Filed: Jul. 26, 2001

(65) Prior Publication Data

US 2002/0050766 A1 May 2, 2002

(30) Foreign Application Priority Data

Aug. 22, 2000 (JP) ........................................ 2000-251404
Aug. 23, 2000 (JP) ........................................ 2000-252442

(51) Int. Cl.$^7$ ............................. F16C 32/06; F16C 33/72
(52) U.S. Cl. ........................ 384/107; 384/100; 384/130; 384/279
(58) Field of Search ................................ 384/100, 107, 384/119, 124, 130, 279

(56) References Cited

U.S. PATENT DOCUMENTS

| | | | | |
|---|---|---|---|---|
| 5,765,952 A | * | 6/1998 | Dekker et al. | 384/107 |
| 6,023,114 A | * | 2/2000 | Mori et al. | 310/42 |
| 6,196,722 B1 | * | 3/2001 | Asada et al. | 384/107 |
| 6,241,393 B1 | * | 6/2001 | Georges et al. | 384/130 |
| 6,357,920 B1 | * | 3/2002 | Mori et al. | 384/114 |
| 6,390,681 B1 | * | 5/2002 | Nakazeki et al. | 384/107 |

* cited by examiner

Primary Examiner—Thomas R. Hannon
(74) Attorney, Agent, or Firm—Arent Fox Kintner Plotkin & Kahn

(57) ABSTRACT

A hydrodynamic oil-impregnated sintered bearing unit 1 are comprised a hydrodynamic oil-impregnated sintered bearing 1a, a housing 1b, and a thrust bearing portion for thrust-supporting a shaft. A sealing washer 20 made of metal or resin material is arranged on an opening-portion side of the housing 1b, and that, of a surface of the shaft 2, at least on a region including a portion opposite to the sealing washer 20 a thin layer 21 of a fluorine-containing polymer is formed.

23 Claims, 8 Drawing Sheets

Fig.8

Shaft vibration (μm)

|  | Initial state | 3000 hours later |
|---|---|---|
| Example 1 | 1.5 | 1.8 |
| Example 2 | 1.2 | 1.4 |
| Example 3 | 1.6 | 1.4 |
| Example 4 | 1.3 | 1.3 |

Fig.9

Current values (mA)

|  | Initial state | 3000 hours later |
|---|---|---|
| Example 1 | 340 | 335 |
| Example 2 | 338 | 333 |
| Example 3 | 344 | 341 |
| Example 4 | 335 | 332 |

HYDRODYNAMIC OIL-IMPREGNATED SINTERED BEARING UNIT

BACKGROUND OF THE INVENTION

The present invention relates to a hydrodynamic oil-impregnated sintered bearing unit having a higher accuracy of rotation, a higher rotation stability, and an improved durability, and more particularly to a hydrodynamic oil-impregnated sintered bearing unit which is suitable for use as a spindle supporter in spindle motors for information equipment, for example, a motor for driving an optical disc unit such as CD-R, CD-RW, DVD-ROM, or DVD-RAM, a magneto-optical disc unit such as MD and MO, and a magnetic disc unit such as HDD, or a polygon scanner motor or the like of a laser beam printer (LBP).

For the spindle motors of the above stated information equipment, there has been a demand for a higher speed capability, lower costs, lower noise in addition to-higher accuracy of rotation. One of the key elements that determine those high performance requirements is a bearing for supporting a spindle of a motor. Conventionally, as a bearing of this type, a ball bearing or an oil-impregnated sintered bearing have been used.

However, a spindle motor of the type is usually operated at a rotational speed as high as 5000 to 12000 rpm. Particularly, a polygon scanner motor used in an LBP is mostly operated at a rotational speed as high as 20000 to 35000 rpm. Thus, the technology of a ball bearing cannot meet requirements such as noise reduction and cost reduction any longer. Moreover, there has been a strict demand for higher and higher accuracy of rotation, that is, lower shaft vibration, lower NRRO (Non Repeatable Run Out), and lower jitter. It is thus becoming increasingly difficult to meet the above-described high performance requirements with the technology of a oil-impregnated sintered bearing.

Nowadays, from the above point of view, as a bearing of the type, a hydrodynamic oil-impregnated sintered bearing has come to be partly in practical use. This bearing is, for example, composed of a bearing body made of a porous sintered metal impregnated with a lubricating oil or lubricating grease, and non-contactingly supports a spindle by forming a lubricating oil film in a bearing gap by exploiting a dynamic-pressure effect exerted by a dynamic-pressure groove formed in the bearing surface. This construction is capable of coping with the above-described high performance requirements.

However, low-profile information equipment typified by notebook-type personal computers require spindle motors used therewith to be made slimmer and slimmer. Thus, the space volume around a bearing portion tends to be decreased. Moreover, rotational speed is on the increase, which accordingly causes the temperature of the bearing to rise during operation. Thus, the amount of oil exuding from the bearing body due to thermal expansion is increased, and the gap between the sealing washer and the shaft, which is provided for prevention of oil leakage, is inconveniently filled with the seepage of oil. In this state, when the operation comes to a halt, the oil accumulated between the sealing washer and the bearing body is collected in the bearing body again by its thermal contraction, but the oil accumulated between the shaft and the sealing washer might remain uncollected due to capillarity. That is, the inner portion of the bearing unit is sealed with the oil accumulated between the shaft and the sealingwasher. In this state, when the operation is resumed, the airbetween the sealing washer and the bearing body is expanded. Therefore, the oil accumulated between the shaft and the sealing washer is pushed out of the bearing unit and is, as a rotation occurs, scattered around. As a result, the periphery of the bearing is contaminated, and simultaneously a repetition of this phenomenon causes the amount of oil to decrease. This leads to oil shortage and makes it impossible to attain an adequate dynamic-pressure effect.

To cope with such inconveniences, some measures can be considered. For example, applying a commonly-used oil repelling agent, such as a silicone-based oil repelling agent or a PTFE-based oil repelling agent, to the sealing washer or the outer circumferential surface of the shaft opposed thereto, or spraying such an oil repelling agent diluted in an organic solvent to the same. In a case where the shaft is subjected to oil repelling treatment, it is preferable to apply an oil repelling agent to the entire surface of the shaft by immersing the shaft in an agent solution in consideration of the operation efficiency. In this case, however, the processed film is unduly thick and the film thickness varies from several $\mu$m to 10 $\mu$m. This makes it difficult to control the bearing gap. If the application is conducted by spraying, the film thickness varies more greatly, making the control of the bearing gap more difficult.

Moreover, those oil repelling agents have weaker adhesive strength with respect to a base material and thus exert poor durability. Furthermore, when exposed to oil constantly, the oil repelling agents may possibly be dissolved in oil gradually and consequently the oil repelling effect is deteriorated with the passage of time. This makes it difficult to obtain a stable oil repelling effect for a long period of time.

SUMMARY OF THE INVENTION

An object of the present invention is therefore to provide a low-cost hydrodynamic oil-impregnated sintered bearing unit capable of preventing the leakage of lubricating oil to the outside of the unit for a longer period of time with stability, wherein a bearing gap is easily controlled.

To achieve the above object, a hydrodynamic oil-impregnated sintered bearing unit according to the present invention includes: a hydrodynamic oil-impregnated sintered bearing made of a sintered metal and composed of a bearing body having a radial bearing surface opposed via a bearing gap to an outer circumferential surface of a shaft, the bearing body being impregnated with a lubricating oil or lubricating grease, the hydrodynamic oil-impregnated sintered bearing non-contactingly supporting the shaft by exploiting a dynamic pressure effect generated by a relative rotation between the shaft and the bearing body; a housing with its one end opened and its other end closed, the housing having in its inner diameter portion said hydrodynamic oil-impregnated sintered bearing; and a thrust bearing portion for thrust-supporting the shaft, wherein a sealing washer made of a metal or resin material is arranged on an opening-portion side of the housing, and wherein, of a surface of the sealing washer, at least on an inner circumferential surface opposite to the shaft a thin layer of a fluorine-containing polymer is formed.

By forming a thin film of a fluorine-containing polymer at least on the inner circumferential surface of the sealing washer in this way, it is possible to repel oil that is about to exude through the shaft and thus successfully prevent the leakage of oil from the bearing unit.

As the fluorine-containing polymer, for example, a fluoropolyether polymer can be considered that has a main structural unit represented by a formula: —$C_xF_{2x}$—O— (x is an integer of from 1 to 4). The average molecular weight of the fluoropolyether polymer preferably falls in the range of 500 to 50000. A fluorine-containing polymer of this type can be formed into a film of even thickness which is far thinner than a bearing gap by simple means, such as application or immersion. This makes the control of a bearing gap easy. Moreover, the fluorine-containing polymer has high adhesion with respect to metal and is thus excellent in durability, and has satisfactory oil resistance and thus offers a stable oil-repelling effect for a long period of time.

In a case where the average molecular weight is no greater than 500, the following inconveniences arise.
(1) The polymer is highly volatile due to an unduly small molecular weight. For example, if there remain unreacted compounds, optical equipment might be contaminated by the volatilization.
(2) As the oil repelling effect is gradually decreased, the preservation stability is deteriorated. Specifically, the smaller the molecular weight, the shorter the molecular length. The molecular is so structured as to have functional groups on both sides of its portion exerting oil repellency. Even if the total length of the molecular is made short, the length of the functional group is kept unchanged. Consequently, the length of the portion exerting oil repellency becomes short and thus the oil repelling effect is decreased. Moreover, since the functional groups have the property of bounding together at high humidities, the greater the concentrations of the functional groups, the easier they bound together. This leads to degradation in the preservation stability.

On the other hand, in a case where the average molecular weight is greater than 50000, the following inconveniences arise.
(1) The entire length of the molecular becomes long, but, as described above, the lengths of the functional groups are kept unchanged. Therefore, the adsorption (reaction) property becomes weak.
(2) An unduly large molecular weight entails high viscosity. This may lead to an increase in the film thickness and to uneven thickness, and thus makes highly precise dimension control impossible.

Similar advantageous effects can be attained in a case where the above stated fluorine-containing polymer thin film is formed on the region of the surface of the shaft opposite to the sealing washer. The above stated fluorine-containing polymer can be formed into a significantly thin film of even thickness. Therefore, even if it is applied to the entire surface of the shaft, the application has little effect on the bearing gap. This makes the control of the bearing gap easy. Moreover, it is possible to improve the efficiency to the application process by employing a full-coating method. In this case, the sealing washer is preferably made of a material in which a contact angle between the material and a lubricating oil to be used is 20° or above, or may be subjected to surface treatment to obtain the same effect. This enhances the oil-repelling effect and thus a more satisfactory oil leakage prevention effect can be attained.

Moreover, a satisfactory oil leakage prevention effect can also be attained by forming a thin layer of a fluorine-containing polymer, of the surface of the sealing washer, at least on the inner circumferential surface opposite to the shaft, and, of the surface of the shaft, at least on the region including the portion opposite to the sealing washer.

Furthermore, the same effect can also be attained by forming a thin layer of a fluorine-containing polymer, of the surface of the sealing washer, at least on a top surface, and, of the surface of the shaft, at least on an upper part of a region opposite to an inner surface of the sealing washer.

In either case, by setting the radial gap between the shaft and the sealing washer at 0.1 mm or below, sufficient capillarity can be obtained. This is further advantageous in prevention of oil leakage.

Forming a dynamic-pressure groove inclined with respect to an axial direction on the radial bearing surface makes it possible to form a highly-rigid, stable oil film in the bearing gap. This enhances rotational accuracy.

By forming a ventilating path opening into both end portions of the bearing body between the outer circumferential surface of the bearing body and the inner circumferential surface of the housing, when the shaft is inserted into the inner circumferential hole of the bearing body, the air trapped within the housing is allowed to pass through the ventilating path so as to be discharged from the housing. This helps prevent air from being dragged into the bearing gap and make the insertion of the shaft smooth.

The hydrodynamic oil-impregnated sintered bearing unit described above is suitable for use in an optical disc drive spindle motor for rotating an optical disc by exploiting a relative rotation between the shaft and the bearing body, a magnetic disc drive spindle motor for rotating a magnetic disc by exploiting a relative rotation between the shaft and the bearing body, a polygon scanner motor for rotating a polygon mirror by exploiting a relative rotation between the shaft and the bearing body, or the like. Note that the "optical disc" mentioned here also refers to a magneto-optical disc, such as MD or MO.

To overcome the above stated technical subject, the present invention is a hydrodynamic oil-impregnated sintered bearing unit including: a rotary shaft body having in a bottom-end portion of its shaft portion a flange portion; a housing portion formed into a sleeve with a bottom having at its one end an opening portion, the housing portion having a thrust bearing gap interposed between its bottom surface and a bottom-end surface of the flange portion; a bearing member having a radial bearing gap interposed in an outer diameter surface of said shaft portion and having a thrust bearing gap interposed between an end surface of the flange portion and an opposite end surface, the bearing member being housed in said housing portion; and a sealing member arranged on an opening-portion side of said housing portion and having a through portion into which said shaft portion is inserted, wherein said bearing member is composed of a porous material of sintered metal in which a lubricating oil or lubricating grease is impregnated, and said bearing member is constructed such that a dynamic pressure is generated in said thrust bearing gap and said radial bearing gap, the bearing unit characterized in that, of a surface of the sealing member, at least on a top surface a coating film of a fluorine-containing polymer is formed.

According to this construction, lubricating oil, after passing through the radial bearing gap and the outer circumferential surface of the shaft portion, reaches the through portion of the sealing member, is then subjected to the capillarity occurring in the through portion, and is repelled on the top surface of the sealing member having a coating film of a fluorine-containing polymer formed. This prevents the leakage of oil to the outside of the bearing unit successfully, and, at the time when the relative rotation between the rotary shaft body and the bearing member comes to an end, the lubricating oil existing in the gap between the inner diameter surface of the sealing member and the outer diameter surface of the shaft portion is surely collected in the bearing member.

As the fluorine-containing polymer, a polymer which is suitable for forming a coating film on the surface of metal or resin, for example, a polyfluoroalkyl polymer or a fluoropolyether polymer is preferable. Moreover, it is preferable that those polymers include a functional group having a high affinity for metal, for example, an epoxy group, an amino group, a carboxyl group, a hydroxyl group, a mercapto group, an isocyanate group, a sulfone group, an ester group, or the like.

Such a fluorine-containing polymer can be formed into a thin film of even thickness with a technique commonly used for application, such as spraying or immersion. Moreover, the fluorine-containing polymer offers high adhesion with respect to metal and is not dissolved in oil easily, and accordingly exerts a satisfactory oil-repelling effect for a long period of time and an improved durability.

Moreover, a similar advantageous effect can be attained in a case where the above stated fluorine-containing polymer coating film is formed, of the surface of the shaft portion, at least on the upper part of the outer diameter surface region opposite to the through portion. Particularly, this fluorine-containing polymer can be formed into a thin coating film of even thickness. Therefore, even if it is applied to the entire or substantially entire area of the surface of the shaft portion in view of simplification of the operation, the radial bearing gap can be controlled with ease.

Further, a similar advantageous effect can be attained also in a case where the above stated fluorine-containing polymer coating films are formed, of the surface of the sealing member, at least on the top surface, and, of the surface of the shaft portion, at least on the upper part of the outer diameter surface region opposite to the through portion, respectively. With an eye particularly to the oil-repelling effect, a synergistic effect of oil-repelling treatment on the sealing member and oil-repelling treatment on the shaft portion significantly enhances the oil-repelling effect. This further improves the oil leakage prevention effect.

In this case, it is preferable that the sealing member be made of a metal material or a resin material, that a gap between the inner diameter surface of the sealing member and the outer diameter surface of the shaft portion be set at 0.1 mm or below, and that the sealing member be made of a material in which a contact angle between the material and a lubricating oil to be used is 20° or above, or be subjected to surface treatment to achieve the same effect. This construction has the advantages of a satisfactory oil-repelling effect and optimal oil leakage prevention effect.

Forming a dynamic-pressure groove inclined with respect to an axial direction on the radial bearing surface makes it possible to form a highly-rigid, stable oil film in the radial bearing gap. This provides highly accurate rotational characteristics. Moreover, forming a dynamic-pressure groove inclined with respect to a radial direction on the thrust bearing surface makes it possible to form a stable oil film in the thrust bearing gap. This provides satisfactory thrust bearing performance.

Then, the above stated dynamic-pressure bearing unit is incorporated into a disc-driving spindle motor of information equipment. Consequently, there is realized a spindle motor suitable for use in a disc driving unit that satisfies high performance requirements including higher accuracy of rotation, a higher speed capability, lower costs, and lower noise, for example, an optical disc drive or a magnetic disc drive. Note that the "optical disc" mentioned here also refers to a magneto-optical disc, such as an MD, MO, or the like.

BRIEF DESCRIPTION OF THE DRAWINGS

FIG. 8 is a view showing the results of experiments.

FIG. 9 is a view showing the results of experiments.

DESCRIPTION OF PREFERRED EMBODIMENTS

Figure 1:
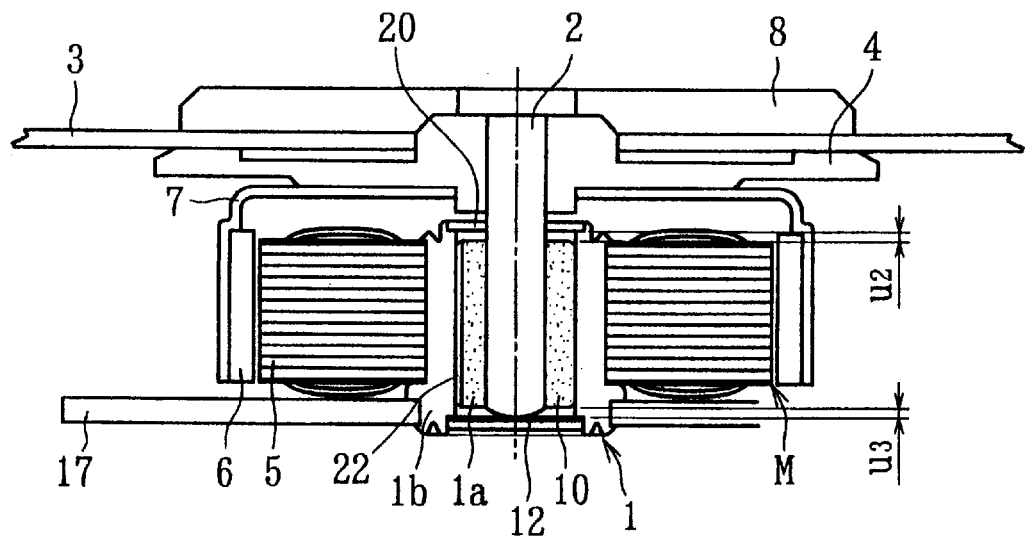
FIG. 1 is a sectional view in an axial direction of a DVD-ROM spindle motor employing the bearing unit according to the present invention.

FIG. 1 is a sectional view of a spindle motor of an optical disc drive (used for a DVD-ROM unit), one of information equipment. This spindle motor is composed of a bearing unit 1 for supporting a vertical rotary shaft 2, a turntable 4 and a clamper 8 mounted at the upper end of the rotary shaft 2 for fixedly supporting an optical disc 3, such as DVD-ROM, and a motor portion M having a stator 5 and a rotor magnet 6 that are opposite to each other via a radial gap. When the stator 5 is energized, the rotor magnet 6 is rotated by an exciting force generated between itself and the stator 5. This causes a rotor case 7 integrated with the rotor magnet 6, the turntable 4, the optical disc 3, the clamper 8, and the rotary shaft 2 to rotate. In a case where the bearing unit 1 is used in a spindle motor of other information equipment, for example, a magnetic disc drive, a disc hub (not shown) for holding one or a plurality of magnetic discs is attached to the rotary shaft 2. In a case where the bearing unit 1 is used in an LBP polygon scanner motor, a polygon mirror (not shown) is attached to the rotary shaft 2.

Figure 2A:
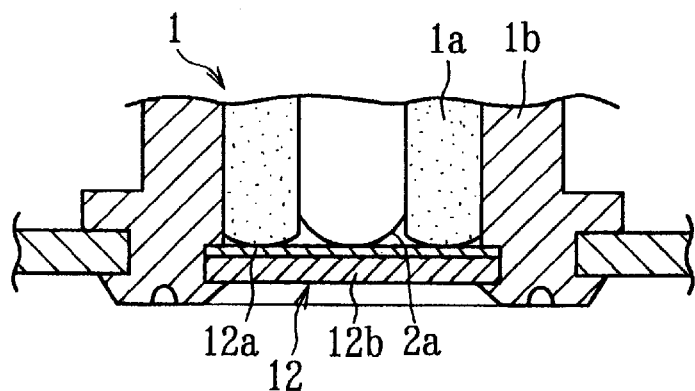
FIG. 2A is an enlarged sectional view of the bottom portion of the bearing unit.
Figure 2B:
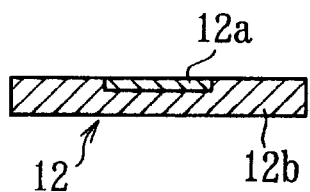
FIG. 2B is a sectional view showing another example of the thrust bearing portion.

The bearing unit 1 is mainly composed of a sintered oil-containing bearing 1a and a housing 1b having the sintered oil-containing bearing 1a fixed to its inner diameter portion. The housing 1b is formed into a cylinder with a bottom having its one end opened and its other end closed, and is fixed to a base 17 with its one-end side opening portion pointing upward. The other-end side of the housing is, for example, as shown in the figure, blocked with a thrust bearing portion 12. As shown in FIG. 2(a), the thrust bearing portion 12 is composed of, for example, a resin-made, disc-shaped thrust washer 12a and a back plate 12b for supporting it laminated on each other. The metal-made rotary shaft 2 made of a steel material or the like is, at its bottom end, abutted against the thrust washer 12a and is thereby supported in a thrust direction. The thrust bearing portion 12 may be constructed in any given manner, for example, as shown in FIG. 2(b), a resin-made thrust washer 12a may be embedded in a recess formed in the central portion of the backplate 12b. Moreover, the thrust washer 12a maybe formed integrally with the housing 1b.

Figure 3:
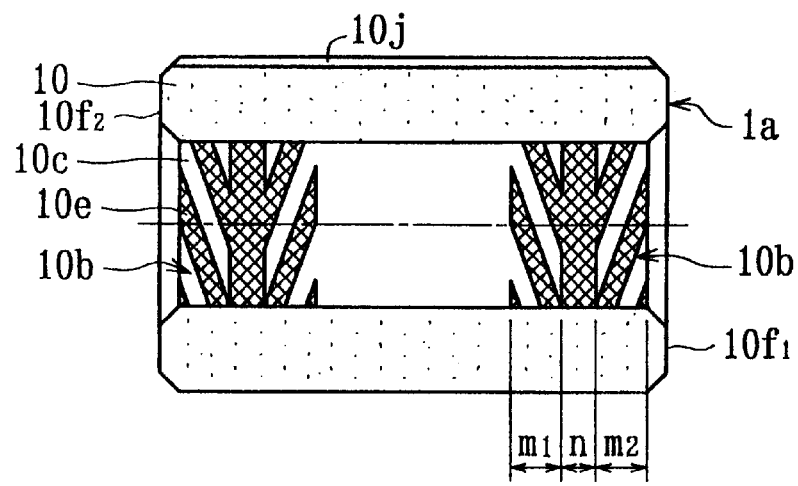
FIG. 3 is a sectional view in an axial direction of a sintered oil-containing bearing.

As shown in FIG. 3, the sintered oil-containing bearing 1a is realized by impregnating a cylinder-shaped bearing body 10 which is made of a sintered metal and has a radial bearing surface 10b opposite via a bearing gap to the outer circumferential surface of the rotary shaft 2 with a lubricating oil or lubricating grease (preferably blended with low-concentration viscosity improver). The bearing body 10, made of a sintered metal, is formed of sintered a metal which is composed predominantly of copper or iron, or both of them, and preferably contains copper in the amount of 20 to 95 wt %. On the inner circumference of the bearing body 10 two bearing surfaces 10b that are axially separated from each other are formed. Of the two bearing surfaces 10b, at least one has a plurality of dynamic-pressure grooves 10c inclined with respect to the axial direction (the herringbone-shaped grooves) arranged circumferentially in an array. It is essential only that the dynamic-pressure groove 10c be so formed as to be inclined with respect to the axial direction. As long as this condition is satisfied, a groove of any other shape than the herringbone shape, for example, a spiral-shaped groove may be used. It is advisable to set the groove depth of the dynamic-pressure groove 10c in the range of 2 to 6 $\mu$m, for example, it is set at 3 $\mu$m.

This sintered oil-containing bearing 1a is fixed to the inner circumference of the housing 1b by press-fitting or bonding. At this time, a proper quantity of lubricating oil is initially applied thereto to fill the bearing gap with oil. As the rotary shaft 2 rotates, due to the generation of pressure and temperature increase accompanied by the rotation, the oil is thermally expanded, and thereby the lubricant (the base oil of lubricating grease or lubricating oil) contained inside the bearing body 10 exudes from the surface of the bearing body 10. Then, by the action of the dynamic-pressure groove, the seepage finds its way into the bearing gap. The oil that has reached the bearing gap forms a lubricating oil film so as to non-contactingly support the rotary shaft. In other words, where the radial bearing surface 10b is provided with the above stated inclined dynamic-pressure groove 10c, by its dynamic-pressure effect, the seepage of the lubricant contained in the bearing gap and the bearing body 10 finds its way into the bearing gap. At this moment, the lubricant is continuously forced into the bearing surface 10b. This helps increase the strength of the oil film and thus improve the rigidity of the bearing.

When a positive pressure is generated in the bearing gap, since the radial bearing surface 10b has on its surface holes (the opening portion: the portion in which the pores of a porous organization open into the outside surface), the lubricant rotary flows into the inner portion of the bearing body. Then, newly introduced fresh lubricant is forced into the bearing gap one after another, thereby maintaining the oil film strength and the rigidity sufficiently high. In this case, it is possible to form a stable oil film successively and thereby achieve higher accuracy of rotation and reduction in shaft vibration, NRRO, and jitter. Moreover, the rotary shaft 2 and the bearing body 10 rotate without making contact with each other and thus noise is suppressed. This also succeeds in reducing the cost.

In this embodiment, a single bearing body 10 is employed and it has, in several positions (two positions in this embodiment) around its inner diameter surface, dynamic-pressure bearing surfaces 10b. This configuration is adopted for the purpose of avoiding a problem which may arise where a plurality of bearings 1 are arranged in a separately-provided component, such as lack of precision. In other words, assuming that a plurality of bearings 1a are housed in the housing 1b. In this case, the coaxiality or cylindricity accuracy of each bearing 1a comes in question. If the accuracy is poor, the rotary shaft 2 makes line contact with the bearing 1a, otherwise, in the worst case, the rotary shaft 2 may not pass through the two bearings completely. By contrast, in this embodiment, as described above, a plurality of bearing surfaces 10b are formed in a single bearing body 10. This arrangement helps avoid such problems.

The radial bearing surfaces 10b are each provided with: a first groove region m1 in which dynamic-pressure grooves 10c are so arranged as to be inclined with respect to one direction; a second groove region m2 axially separated from the first groove region m1 and in which dynamic-pressure grooves 10c are so arranged as to be inclined with respect to the other direction; and a circular smoothing portion n placed between the two groove regions m1 and m2. The dynamic-pressure grooves 10c of the two groove regions m1 and m2 are so divided as to be discontiguous to each other across the smoothing portion n. The smoothing portion n and the back portion 10e between the dynamic-pressure grooves 10c are kept at identical levels. In the dynamic-pressure groove 10c with such a discontiguous configuration, as compared with that with a contiguous configuration, i.e., the case where the smoothing portion n is omitted and the dynamic-pressure grooves 10c are arranged in the form of V so as to be contiguous to each other through the groove regions m1 and m2, oil is collected particularly in the smoothing portion n, and thereby a sufficiently high oil film pressure can be obtained. Moreover, placement of the smoothing portion n with no groove contributes to improvement of the rigidity of the bearing.

Figure 4:
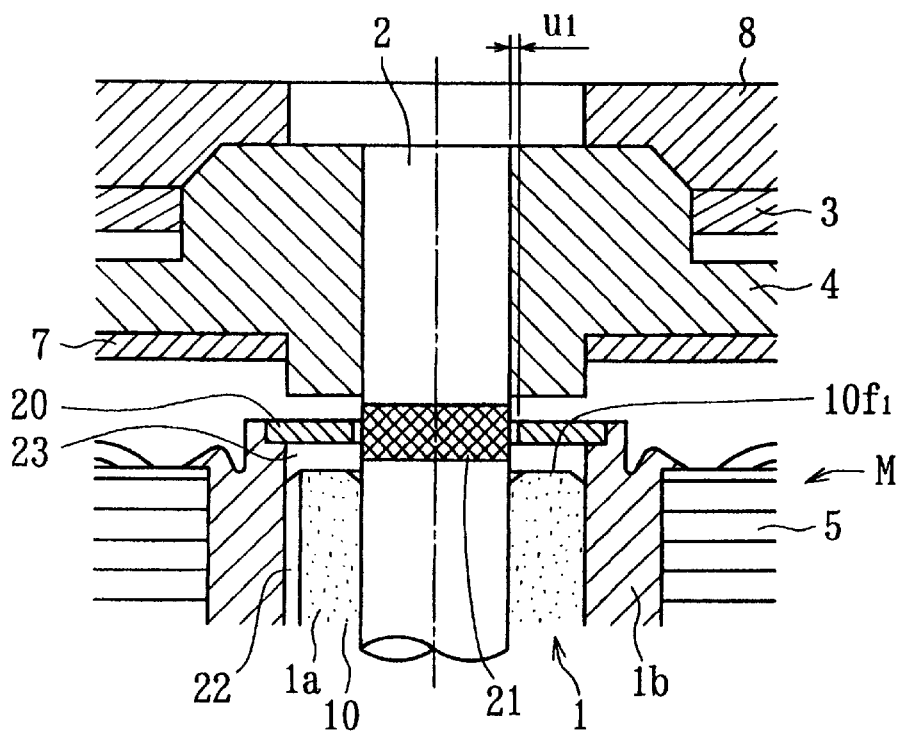
FIG. 4 is an enlarged sectional view in an axial direction of the vicinity of the housing opening portion.

As shown in FIG. 4, the one-end side opening portion of the housing 1b is sealed with a non-contact sealing member, for example, a sealing washer 20. The sealing washer 20, formed into a thin-walled circular plate having in its central portion an insertion hole in which the rotary shaft 2 is inserted, is made of a metal material, for example, free-cutting brass, and is fixed to the one-end side opening portion of the housing 1b by press-fitting or bonding, or other means. It is essential only that the sealing washer 20 take the form of a washer, and thus it may be formed from other metal materials than brass, or a resin material. The sealing washer 20 is so constructed that its inner circumferential surface is placed as close to the outer circumferential surface of the rotary shaft 2 as possible to prevent the leakage of oil from the inside of the housing 1b due to capillarity. If the sealing washer 20 is brought into contact with the shaft 2, an increase and variation in torque occurs. This is detrimental to a spindle motor for use with information equipment required to operate with high accuracy. Accordingly, the sealing washer 20 is kept from contact with the shaft 2. It is preferable that the width u1 of the gap (the radial gap) between the inner circumferential surface of the sealing washer 20 and the outer circumferential surface of the rotary shaft 2 be set at 0.1 mm or below, more preferably, 0.05 mm or below. By doing so, even if the shaft is placed in a horizontal or reverse position, oil leakage can be prevented without fail due to capillarity. Note that air is allowed to flow through the gap u1 and is thus discharged smoothly out of the housing 1b.

In the present invention, of the surface of the sealing washer 20, at least on the inner circumferential surface opposed to the outer circumferential surface of the rotary shaft 2, or, of the surface (the outer circumferential surface) of the shaft 2, at least in the region including the portion opposed to the inner circumferential surface of the sealing washer 20 (for example, the region having an axial width greater than the thickness of the sealing washer 20) a thin layer 21 or a coating film of an oil repelling agent made of a fluorine-containing polymer is formed across the entire circumference thereof. FIG. 4 shows the example in which the thin layer 21 is formed on the outer circumferential surface of the rotary shaft 2. By forming the thin layer 21 of an oil-repelling agent in this way, it is possible to repel oil that is about to exude through the rotary shaft 2 and thus prevent oil leakage perfectly. As the fluorine-containing polymer, a polymer that is suitable for forming a thin layer on the surface of the metal-made shaft 2 or the sealing washer 20, for example, a polyfluoroalkyl polymer or a fluoropolyether polymer is preferable.

The polyfluoroalkyl polymer is a polymer including a polyfluoroalkyl group, and as an example thereof

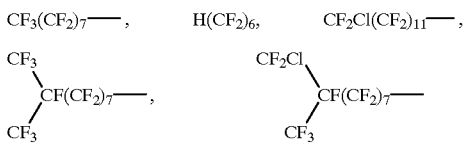

is exemplified.

Moreover, the fluoropolyether polymer has

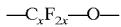

wherein x is an integer of from 1 to 4. a main structural unit represented by the foregoing, and it has a number average molecular weight of from 500 (or 1000) to 50,000.

Of these polymers, the fluoropolyether polymer is more preferable, because its use enables creation of a thin layer with even thickness on the surface of metal.

Moreover, it is preferable that the fluoropolyether polymer and the polyfluoroalkyl polymer include a functional group having a high affinity for metal, for example, an epoxy group, an amino group, a carboxyl group, a hydroxyl group, a mercapto group, an isocyanate group, a sulfone group, an ester group, or other. Specific examples thereof include those shown as follows:

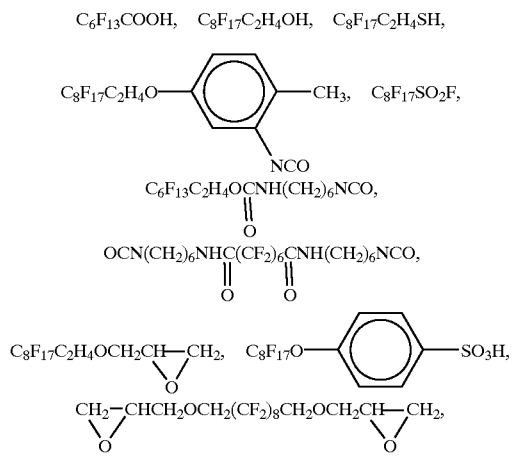

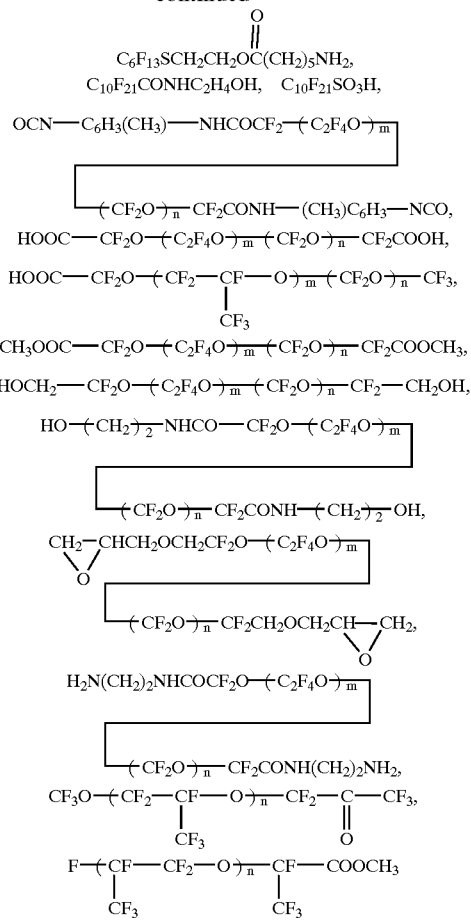

Although the above stated fluorine-containing polymers may be used singly, in view of adhesion with respect to metal, the fluorine-containing polymer preferably includes an epoxy group or an isocyanate group. A fluorine-containing polymer containing an epoxy group is preferably hardened by adding thereto amines, acid anhydrides, or curing catalysts. In a case where a fluorine-containing polymer containing an isocyanate group is used singly, it is preferable to add thereto isocyanate trimer catalysts, such as dibutyltindilaurate, a kind of tin compounds.

Moreover, two kinds of fluorine-containing polymers may be used in combination. In this case, it is preferable to employ the combined use of one having an epoxy group and one having at least one of an amino group, a carboxyl group, a hydroxyl group, a mercapto group, and others or the combined use of one having a carboxyl group and one having at least one of an amino group and a hydroxyl group, or the combined use of one having an isocyanate group and one having at least one of an amino group, a mercapto group, and a carboxyl group. The groups in combination are reacted with each other to provide a polymer having a higher molecular weight. Such a polymer contributes to creation of a highly durable film.

Further, to obtain a polymer having a higher molecular weight, it is advisable to add to a fluorine-containing polymer having such functional groups organic compounds having functional groups which chemically react with each of the polymer's functional groups. Examples of preferable combined use include: a combination of a fluorine-containing polymer containing an isocyanate group and polyol, such as ethylene glycol, or polyamine, such as diaminodiphenylmethane; and a combination of a fluorine-containing polymer containing a hydroxyl group and isocyanate compounds.

Each of the above stated fluorine-containing polymers itself has a significantly high affinity for a metal surface. However, depending on the kinds of metals, it does not necessarily exert sufficient adhesion strength. To cope with this problem, it is desirable that the polymer is subjected to preliminary treatment with a primer which has an affinity for a metal surface. Examples of such primer include a graft polymer having polymethylmethacrylate as a branch component, and having methylmethacrylate or hydroxyethylmethacrylate unit as a trunk component.

The application method for a fluorine-containing polymer is not particularly limited and thus commonly used techniques may be used. For example, a solution is prepared first by dissolving or dispersing a fluorine-containing polymer in an adequate solvent. Then, the prepared solution is applied by spraying, immersion, or the like, and subsequently the solvent contained is vaporized to form the thin layer 21. Moreover, by additionally conducting heating treatment on the finished thin film, it is possible to impart a higher molecular weight thereto. In a case where a thin film of a fluorine-containing polymer is formed on a metal surface, if the film thickness is unduly great, it is impossible to maintain the dimensional accuracy of the components at appropriate levels, and further, when the thin film is formed on the entire surface of the shaft 2, it is impossible to control the bearing gap properly. Thus, the thickness of the thin layer is preferably set in the range of 0.2 to 2 $\mu$m.

Figure 5:
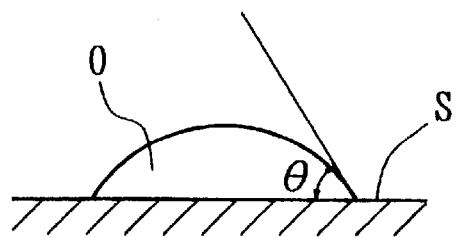
FIG. 5 is a sectional view of assistance in explaining a contact angle.

In a case where the thin layer 21 made of a fluorine-containing polymer is formed on the surface of the shaft 2, it is preferable that the sealing washer 20 be made of a material in which a contact angle $\theta$ between the material and a lubricating oil is 20° or above, or is subjected to surface treatment to enhance the oil-repelling effect. Note that the "contact angle" mentioned here means, as shown in FIG. 5, of the angle which, when oil O is present on a solid surface S, the oil surface forms with the solid surface S, the angle $\theta$ including the oil O. Examples of materials which satisfy such requirements and are also desirable from strength and cost standpoints include a resin material, such as teflon. Note that the kinds of materials and surface treatment for the sealing washer 20 may be determined in accordance with the kinds of lubricating oil to be actually used.

Although the above description deals only with the case where the thin layer 21 of a fluorine-containing polymer is formed on only one of the shaft 2 side and the sealing washer 20 side, the thin layer may be formed on both of the shaft 2 side and the sealing washer 20 side.

Figure 6:
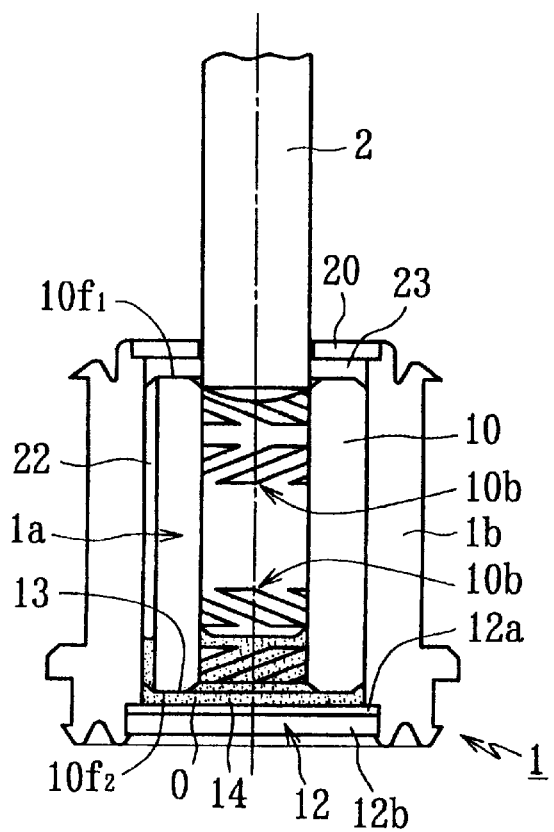
FIG. 6 is a sectional view in an axial direction of the bearing unit, as seen during the insertion of a shaft.

Incidentally, the rotary shaft 2 is normally inserted into the inner diameter portion of the bearing 1a under the state where the thrust bearing portion 12 is attached to the housing 1b. Prior to the insertion of the shaft 2, as shown in FIG. 6, to improve the lubricity, the oil O (indicated by the dotted area of FIG. 6 (also FIG. 7)) is applied to the inside of the housing 1b in some instances. In this case, however, the bearing gap between the bearing 1a and the rotary shaft 2 is as small as several $\mu$m in width. Therefore, the air trapped between the shaft end and the upper surface of the oil O has its escape cut off, making the insertion of the rotary shaft 2 difficult. Moreover, the motor generates heat when driven, and the heat causes the trapped air to be expanded. The expanded air pushes the rotary shaft 2 upward, and this leads to unstable bearing performance. Otherwise, the thermally expanded air pushes the oil outside the bearing, and this may lead to degradation of the lubricity. These problems also arise even when no oil is applied.

Figure 7:
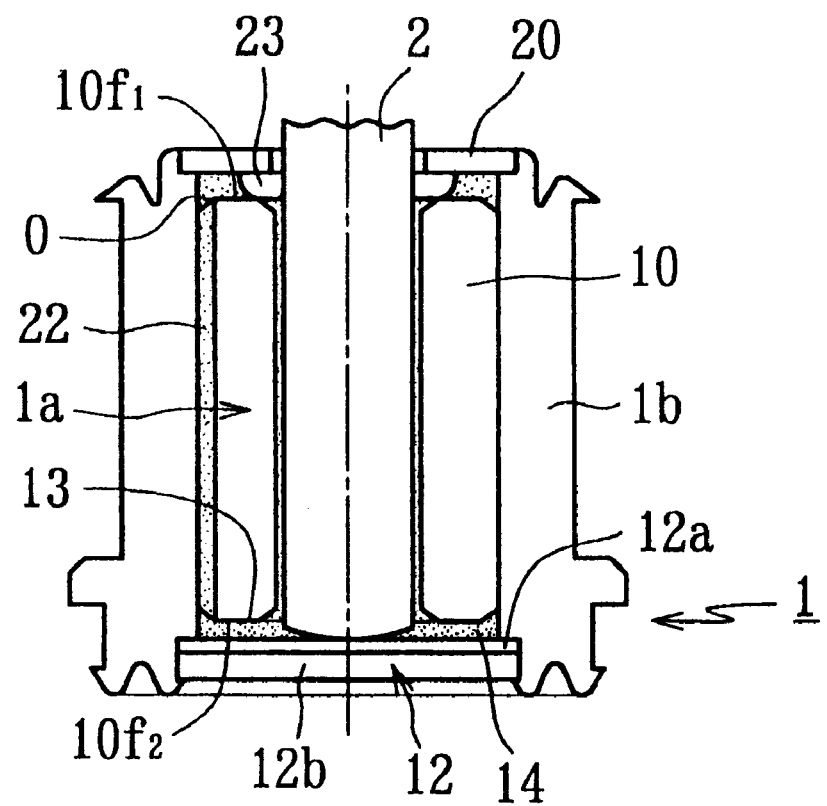
FIG. 7 is a sectional view in an axial direction of the bearing unit, as seen after completion of the insertion of a shaft.

To cope with such inconveniences, as shown in FIGS. 1 and 4, between the outer circumferential surface of the bearing body 10 and the inner circumferential surface of the housing 1b a ventilating path 22 is formed which opens into both axial end portions of the bearing body 10. Through this ventilating path 22, the trapped air is allowed to escape from the bearing. In this case, some air may possibly remain in the oil as bubbles, but such bubbles move upward through the ventilating path 22 so as to be discharged from the housing 1b. Accordingly, after the insertion of the shaft 2, as shown in FIG. 7, it is possible to fill the space inside the housing 1b (specifically, a space 14 between the bearing 1a and the end surface 13 of the thrust washer 12a opposed thereto, a space 23 between the sealing washer 20 and the bearing end surface 10f1 opposed thereto, the bearing gap, the ventilating path 22, and others) with the oil O. As shown in FIG. 3, the ventilating path 22 is formed by, for example, providing an axial groove 10j on the outer circumferential surface of the bearing body 1a, or by providing similar axial groove 10j on the inner circumferential surface of the housing 1b. The ventilating path 22 maybe formed at not only one position but also at a plurality of positions in a circumferential direction.

If the gap 23 between the sealing washer 20 and the bearing end surface 10f1 opposed thereto (hereafter referred to as "the one-end side gap") is unduly large, depending on the amount of oil to be applied, it is impossible to fill the space inside the housing 1b with oil. This leads to an undesirable increase in the quantity of air remaining in the housing 1b, and consequently, when the shaft is placed in a horizontal or reverse position, the air might enter the gap 14 between the thrust washer 12a and the bearing end surface 10f2 (hereafter referred to as "the other-end side gap"). Thus, the one-end side gap 23 is preferably made as small as possible and its width u2 (see FIG. 1) is set at 0.6 mm, for example. The gap width u2 is set only at 1.0 mm or below. Preferably, the gap width u2 is set at 0.5 mm or below, and is set to be greater than the width u3 of the other-end side gap 14 (u2>u3). This is because, if the one-end side gap 23 is smaller than the other-end side gap 14, when the shaft is placed in a reverse position, the one-end side gap 23 is filled with oil earlier, and consequently the air which is prevented from escaping is expected to enter the other-end side gap 14.

In order to confirm the advantages of the embodiment, as described below, examples 1 to 4 and comparative examples 1 and 2 were manufactured, and each example has been subjected to an endurance test against oil leakage. For the examples 1 to 4 and the comparative examples 1 and 2, the target components for the treatment were the sealing washer and the shaft. As described below, the targeted component and treatment vary among the examples.

(1) Example 1: overall surface treatment for the sealing washer+overall surface treatment for the shaft;
(2) Example 2: overall surface treatment for the sealing washer (the shaft was left untreated);
(3) Example 3: treatment only for the surface of the shaft opposed to the sealing washer (the sealing washer was left untreated);
(4) Example 4: the resin washer made of pure teflon+treatment only for the surface of the shaft opposed to the sealing washer;
(5) Comparative example 1: Both components were left untreated; and
(6) Comparative example 2: the use of a silicone-based oil repelling agent (spray type); overall surface treatment for the sealing washer; and treatment only for the surface of the shaft opposed to the sealing washer.

Moreover, for each example, the test was carried out, wherein the test atmosphere was 60° C.; the. shaft diameter was φ3; the shaft was placed in a vertical position; the number of revolutions was 10000 rpm; the driving method was a repeated ON/OFF operation (ON for 10 minutes and OFF for 10 minutes); the duration was 3000 hours; and evaluation was conducted with respect to an oil leakage condition and the change of performance (shaft vibration and current values).

The following is a summary of the materials used for the examples and comparative examples.

(1) Sealing washer free-cutting brass (JIS C3604BD) [for the above examples (1)(2)(3)(5)(6)]; and pure teflon [for the example (4)]

(2) Shaft

SUS materials (JIS SUS420J2)

(3) Fluorine-containing polymer and compounding agents

No. 1. a polyfluoroalkyl polymer containing an epoxy group

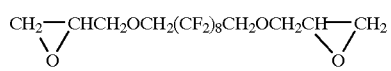

No. 2. a polyfluoroalkyl polymer containing an amino group

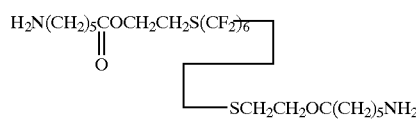

No. 3. a polyfluoroalkyl polymer containing a hydroxyl group

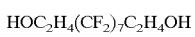

No. 4. a fluoropolyether polymer containing an isocyanate group (average molecular weight: about 2,000) (Trade Name: Fonblin Z-DISOC, manufactured by Ausimont Corp.)

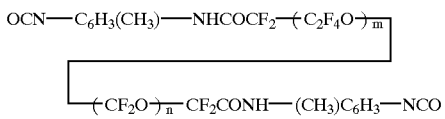

No. 5. a fluoropolyether polymer containing a hydroxyl group (average molecular weight: about 2,000) (Trade Name: Fonblin Z-DOL, manufactured by Ausimont Corp.)

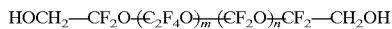

No. 6. an isocyanate compound (the average value of n: 0.6)

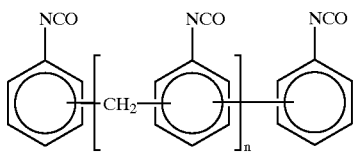

For the manufacture of the examples 1 to 4 and the comparative examples 1 and 2, the shaft was made of an SUS material, and the sealing washer was made of a free-cutting brass or pure teflon. The finished components have been subjected to ultrasonic cleaning with n-hexane for 30 seconds. Next, for the practical examples 1 to 4, a solution for a thin layer was prepared by diluting the above stated fluorine polymer and a compounding agent with a solvent (Vertrel XF, manufactured by Mitsui DuPont Phlorochemical K.K.) to a concentration of 1% by weight. Then, the prepared solution was applied to the shaft and the sealing washer. After completion of the application and drying process, heating treatment was conducted at 120° C. for 3 hours, whereby a thin layer approximately 0.2 to 0.3 μm thick was obtained. In the comparative example 1, the sealing washer and the shaft were constructed basically in the same manner as those of the example 1 except that, in the former, no thin layer of fluorine-containing polymer was formed. Moreover, in the comparative example 2, a commercially available silicone-based water repelling agent was applied to the sealing washer and the shaft using a spray, and subsequently drying treatment was conducted at ordinary temperatures. Note that, in the comparative example 2, the entire surface of the shaft was treated, but as a result the film thickness was greater than 10 μm. This made it impossible to secure a bearing gap and thus insert the shaft 2 into the bearing 1a.

The results of the tests will be described below.

As for the examples 1 to 4, the operation has been performed without any problem for 3000 hours, and, as shown in FIGS. 8 and 9, shaft vibration and current values were found to be much the same as those observed in the initial state. Observation was made after the removal of the rotor (shaft), and it was confirmed that plenty of oil remained within the bearing, that no oil was leaked to the outside of the bearing, and that the oil-wettability of the shaft and the sealing washer changed little. Note that, although the test result shown in FIGS. 8 and 9 is concerned with the case where, as the fluorine-containing polymer, the above mentioned fluoropolyether polymer containing an isocyanate group (No. 4) was used, it can be expected that using an oil-repelling agent containing any other fluorine-containing polymer will achieve the similar result.

On the other hand, as for the comparative example 1, after the test was started, a decrease in the current value was recognized about 10 days later (335 mA at the initial state 305 mA), and an increase in the current value was recognized about 15 days later (305 mA→360 mA). Then, shaft vibration was examined and the value of the shaft vibration observed at the initial state: 2 μm was found to be increased to 10 μm. Observation was made after the removal of the rotor (shaft), and it was confirmed that the inner portion of the bearing member did not get wet with oil, that a stain of radially scattered oil remained on the bottom surface of the rotor, and that the periphery of the motor got wet with scattered oil.

As for the comparative example 2, the operation has been performed without any problem for about 1000 hours, but thereafter the current value was gradually increased, and an increase in the shaft vibration was recognized at the measurement made about 1200 hours later (shaft vibration: 1.7 μm at the initial state→8 μm 1200 hours later; and current value: 330 mA at the initial state→375 mA 1200 hours later). Then, observation was made after the halt of the test and the removal of the rotor (shaft), and it was confirmed that the inner portion of the bearing member did not get wet with oil, that a stain of radially scattered oil remained on the bottom surface of the rotor, and that the periphery of the motor got wet with scattered oil. Moreover, the oil-wettabilities of the shaft and the sealing washer were deteriorated to be substantially equal to those of untreated components. This is probably because the initial oil repelling capability yielded to the oil supplied during the test, or the surface coating film was dissolved in the oil. Accordingly, it is understood that a material of room temperature setting type is useless because of its poor durability.

Figure 10:
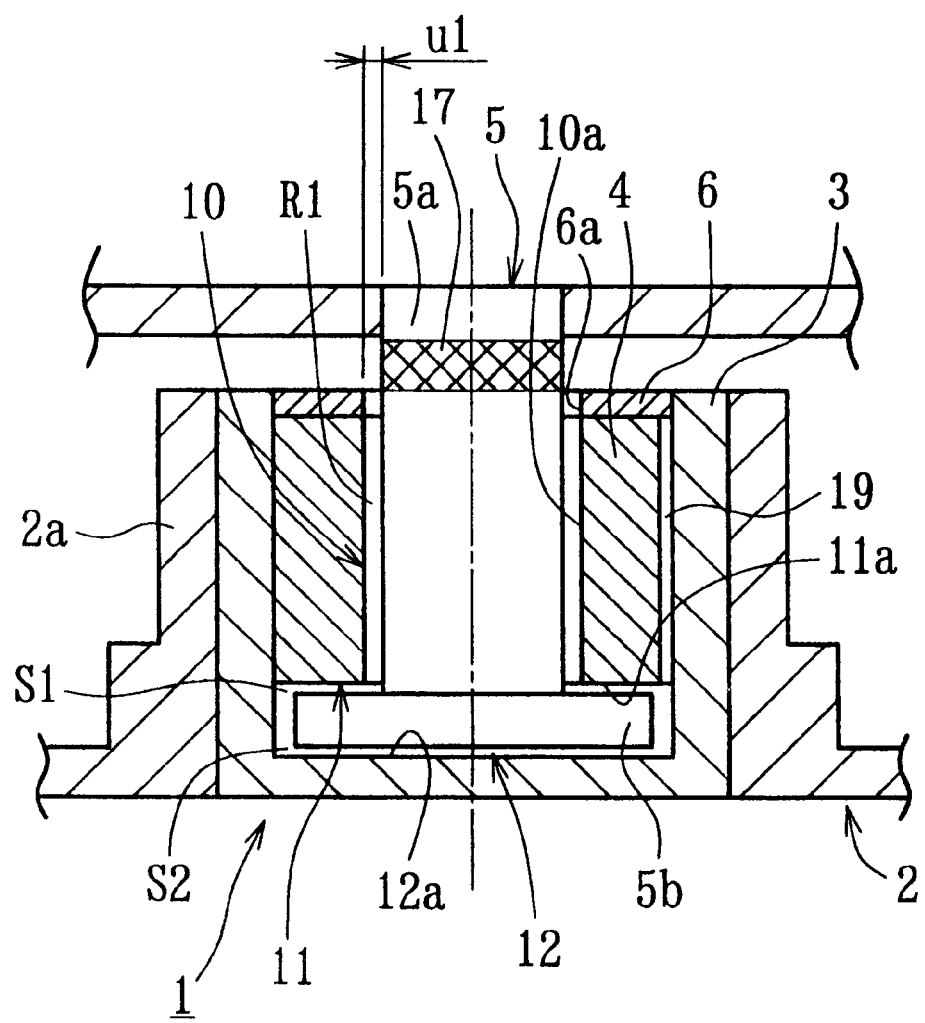
FIG. 10 is an enlarged vertical sectional front view of the principal portion of the spindle motor employing the bearing unit according to the present invention.

FIG. 10 illustrates a dynamic-pressure bearing unit 1 according to the present invention. The bearing unit 1 is mounted in a spindle motor for information equipment similar to that shown in FIG. 4, for example, an HDD (Hard Disc Drive) spindle motor.

As shown in FIG. 10, the bearing unit 1 is mainly composed of: a housing 3 formed into a cylinder with a bottom having its top end opened, the housing 3 being fitted to a boss portion 2a of a casing 2; a substantially cylindrical bearing member (sintered oil-containing bearing) 4 fixed to the inner circumferential surface of the housing 3; a rotary shaft body 5 rotatably and non-contactingly supported by the housing 3 and the bearing member 4; and a sealing member 6, such as a sealing washer, for sealing the end portion of the bearing member 4 opposite to the bottom-end portion. The rotary shaft body 5 has in the bottom-end portion of its shaft portion 5a a flange portion 5b acting as a thrust disc protruding toward the outer-diameter side. The rotary shaft body 5 is arranged such that the shaft portion 5a is located in the inner circumferential portion of the bearing member 4 and the flange portion 5b is housed between the bearing member 4 and the housing 3.

On the inner circumferential surface of the bearing member 8 is formed a radial bearing surface 10a having a plurality of dynamic-pressure grooves. During the rotation of the rotary shaft body 5, a dynamic pressure of lubricating oil is generated in a radial bearing gap R1 between the radial bearing surface 10a and the outer circumferential surface of the shaft portion 5a, thereby constituting a radial bearing portion 10 for non-contactingly supporting the shaft portion 5a in a radial direction.

Figure 11A:
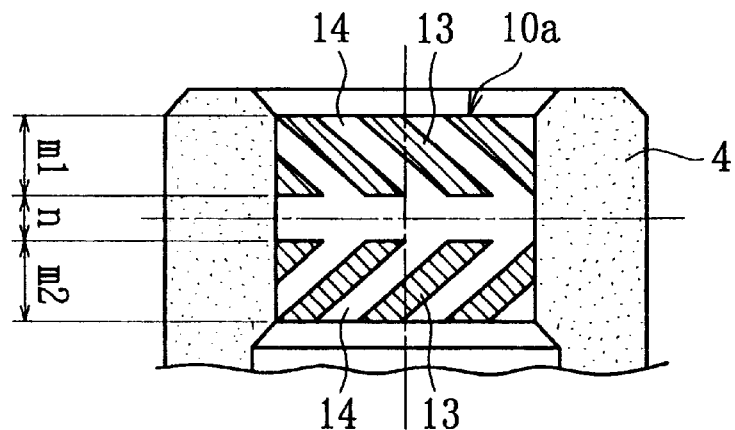
FIG. 11A is an enlarged vertical sectional front view showing the radial bearing surface of the bearing member, in its unfolded state.

FIG. 11A illustrates the shape of the dynamic-pressure groove of the radial bearing surface 10a (the herringbone-shaped groove). As shown in the figure, the radial bearing surface 10a is provided with: a first groove region m1 in which a dynamic-pressure groove 13 is formed that is inclined in one direction; a second groove region m2 arranged so as to be axially separated from the first groove region m1 in which a dynamic-pressure groove 13 is arranged that is inclined in the other direction; and a circular smoothing portion n placed between the two groove regions m1 and m2. The smoothing portion n and the back portion 14 between the dynamic-pressure grooves 13 are kept at identical levels. In this case, it is essential only that the dynamic-pressure groove of the radial bearing surface 10a be so formed as to be inclined with respect to the axial direction. Thus, as long as this condition is satisfied, instead of the herringbone-shaped groove, a groove of any other shape may be adopted, for example, a spiral-shaped groove. The groove depth of the dynamic-pressure groove may preferably be set in a range of 2 to 6 μm, for example, set at 3 μm. Note that the radial bearing surface 10a may be formed on the outer circumferential surface of the shaft portion 5a.

The flange portion 5b has axial gaps, a first thrust bearing gap S1 and a second thrust bearing gap S2 on both sides in the axial direction (see FIG. 10). The first thrust bearing gap S1 is formed between the upper end surface of the flange portion 5b and the lower end surface (the bottom end surface) of the bearing member 4 opposite thereto. The second thrust bearing gap S2 is formed between the lower end surface (the bottom end surface) of the flange portion 5b and the bottom surface of the housing 3 opposed thereto. Although, in this embodiment, the housing 3 has a bottom surface portion formed integrally therewith, the bottom surface portion may be formed separately from the housing 3. On the lower end surface of the bearing member 4 facing the first thrust bearing gap S1 and on the bottom surface of the housing 3 facing the second thrust bearing gap S2 are formed a first thrust bearing surface 11a and a second thrust bearing surface 12a, respectively, of which both have a dynamic-pressure groove. During the rotation of the rotary shaft body 5, a dynamic pressure of lubricating oil is generated between the first and second thrust bearing gaps S1 and S2, thereby constituting a first and a second thrust bearing portion 11 and 12 for non-contactingly supporting the flange portion 5b on both axial sides.

Figure 11B:
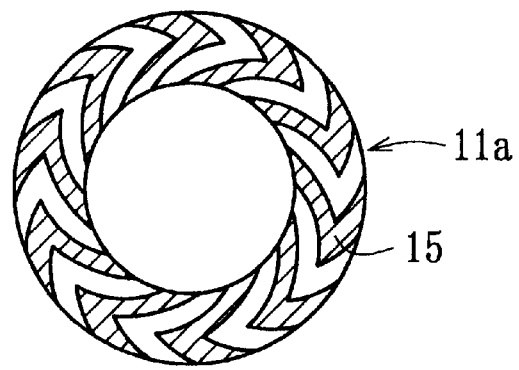
FIG. 11B is an enlarged bottom view showing the thrust bearing surface of the bearing member.
Figure 11C:
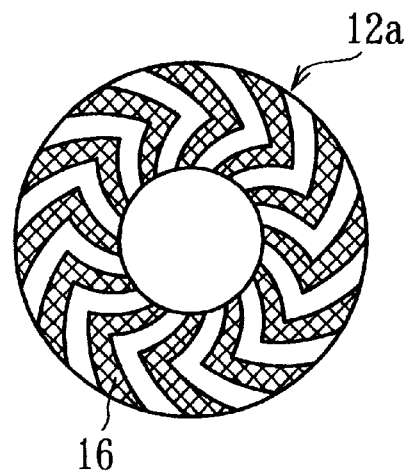
FIG. 11C is an enlarged plan view showing the thrust bearing surface of the housing.

As shown in FIGS. 11B and 11C, the first thrust bearing surface 11a and the second thrust bearing surface 12a each have a plurality of substantially V-shaped dynamic-pressure grooves 15 and 16. The dynamic-pressure groove is inclined with respect to the radial direction and has in its central portion a bent area (the herringbone-shaped groove). These dynamic-pressure grooves 15 and 16 may take other forms than the herringbone shape, for example, a spiral shape. Note that either one or both of the first and second thrust bearing surfaces 11a and 12a may be formed on either one or both of the end surfaces of the flange portion 5b.

The bearing member 4 is made of a sintered metal which is mainly composed of copper or iron, or both of them, and preferably contains copper in the amount of 20 to 95 wt %, in which lubricant composed of lubricating oil or lubricating grease (preferably blended with low-concentration viscosity improver) is impregnated. This bearing member 4 is fixed to the inner circumference of the housing 3 by press-fitting or bonding. At this time, a proper quantity of lubricating oil is initially applied thereto to fill the bearing gaps R1, S1, and S2 with oil. As the rotary shaft body 5 rotates, the generation of pressure and the thermal expansion of oil due to temperature increase accompanied by the rotation cause the lubricant contained inside the bearing member 4 (lubricating oil or the base oil of lubricating grease) to exude from the surface of the bearing member 4. By the action of the dynamic-pressure groove, the seepage of the lubricant finds its way into the bearing gaps R1, S1, and S2. The oil that has reached the bearing gaps R1, S1, and S2 forms a lubricating oil film so as to non-contactingly support the rotary shaft body 5. In other words, by forming the above stated inclined dynamic-pressure grooves 13, 15, and 16 in the radial bearing surface 10a and the thrust bearing surfaces 11a and 12a, respectively, the resultant dynamic-pressure effect causes the seepage of the lubricant to find its way into the radial bearing gap R1 and the thrust bearing gaps S1 and S2. At this moment, the lubricant is continuously forced into the radial bearing surface 10a and the thrust bearing surfaces 11a and 12a. This helps increase the strength of the oil film and improve the rigidity of the bearing.

When a positive pressure is generated in the radial bearing gap R1 and the first thrust bearing gaps S1, since the radial bearing surface 10a and the first thrust bearing surface 11a each have on their surfaces holes (the opening portion: the portion in which the pores of a porous organization open into the outside surface), the lubricant rotary flows into the inner portion of the bearing member 4. Then, newly introduced fresh lubricant is forced into the radial bearing gap R1 and the thrust bearing gaps S1 and S2 one after another, thereby maintaining the oil film strength and the rigidity sufficiently high. In this case, it is possible to form a stable oil film successively and thereby achieve higher accuracy of rotation and reduction in shaft vibration, NRRO, jitter, and the like. Moreover, the rotary shaft body 5 and the bearing member 4 rotate without making contact with each other, and this leads to lower noise. In addition, this construction requires less cost.

The sealing member 6 is formed into a thin-walled circular plate having in its central portion a through hole 6a in which the shaft portion 5a of the rotary shaft body 5 is inserted. The sealing member 6 is made of a metal material, for example, free-cutting brass, and is fixed to the one-end opening portion of the housing 3 by press-fitting or bonding, or other means. The sealing member 6 may also be formed into a washer, or made of other metal or resin materials than brass. The sealing member 6 is so constructed as to have its inner circumferential surface placed as close to the outer circumferential surface of the shaft portion 5a as possible to prevent oil leakage from the inner portion of the housing 3 by exploiting capillarity. If the sealing member 6 is brought into contact with the shaft portion 5a, an increase or variation in torque inconveniently occurs. This is detrimental to a spindle motor for use with information equipment required to operate with high accuracy. Accordingly, the sealing member 6 is kept from contact with the shaft portion 5a. If a gap u1 between the inner circumferential surface of the sealing member 6 and the outer circumferential surface of the shaft portion 5a is set at 0.1 mm or below, more preferably, 0.05 mm or below, even when the shaft is placed in a horizontal or reverse position, oil leakage is prevented without fail by exploiting capillarity.

Particularly, in the present invention, of the surface (the entire surface) of the sealing member 6, at least on the top surface, and/or, of the outer diameter surface of the shaft portion 5a, at least on the upper part of the region including the surface opposed to the inner diameter surface of the sealing member 6 is formed a coating film or a thin layer of an oil repelling agent made of said fluorine-containing polymer.

As the fluorine-containing polymer, said polyfluoroalkyl polymer or said fluoropolyether polymer is preferable. The fluoropolyether polymer has a number average molecular weight of from 1,000 to 50,000.

Figure 12:
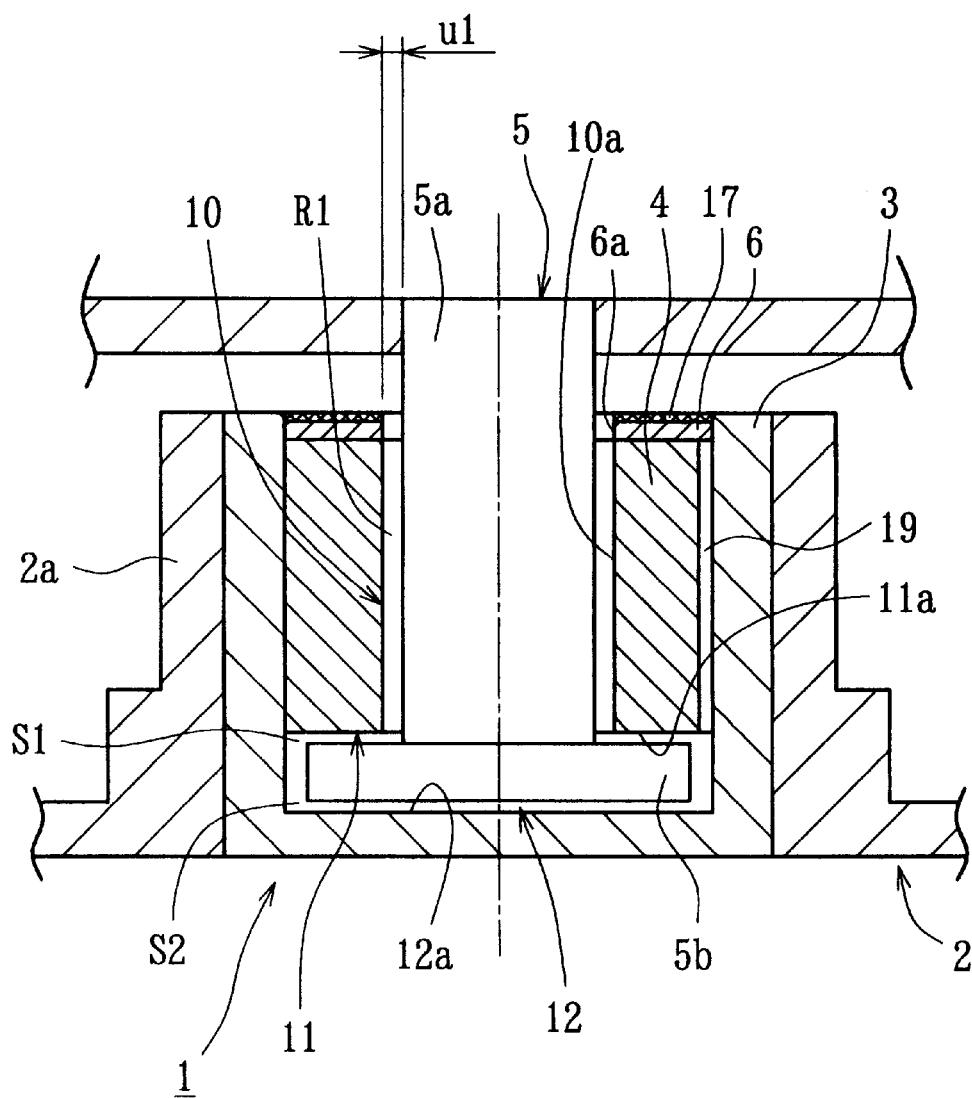
FIG. 12 is an enlarged vertical sectional front view of the principal portion of the spindle motor employing the bearing unit according to the present invention.

FIG. 10 shows the example where a fluorine-containing polymer coating film 17 is formed on the outer circumferential surface of the shaft portion 5a of the rotary shaft body 5. By forming the fluorine-containing polymer coating film 17 in this way, it is possible to repel oil that is about to exude through the shaft portion 5a and thus prevent oil leakage perfectly. FIG. 12 shows the example where a fluorine-containing polymer coating film 17 is formed on the top surface of the sealing member 6.

In a case where the coating film 17 made of a fluorine-containing polymer is formed on the surface of the shaft portion 5a, it is preferable that the sealing member 6 is made of a material in which a contact angle θ between the material and a lubricating oil is 20° or above, or is subjected to surface treatment to obtain the same effect. This enhances the oil-repelling effect.

If a gap between the sealing member 6 and the end surface of the bearing member 4 opposed thereto is unduly large, depending on the amount of oil, it is impossible to fill a space inside the housing 3 with the oil, and consequently the air remaining inside the housing 3 becomes large in quantity. This is undesirable, because, when the shaft is placed in a horizontal or reverse position, air might enter the thrust bearing gaps S1 and S2. Accordingly, the gap is preferably made as small as possible, more preferably, set at zero or approximately zero.

In order to confirm the advantages of the embodiment, the following tests were conducted. For the tests, examples 1 to 5 and comparative examples 1 and 2 were manufactured, and each example was subjected to an endurance test against oil leakage.

(1) Example 1: a coating film was formed on the top surface of the sealing member 6. A coating film was also formed on only the upper part of the surface of the shaft portion 5a opposite to the sealing member 6.

(2) Example 2: a coating film was formed on the entire surface of the sealing member 6. A coating film was also formed on only the upper part of the surface of the shaft portion 5a opposite to the sealing member 6.

(3) Example 3: a coating film was formed on the top surface of the sealing member 6. The shaft portion 5a was left untreated.

(4) Example 4: A coating film was formed on only the upper part of the surface of the shaft portion 5a opposite to the sealing member 6. The sealing member 6 was left untreated.

(5) Example 5: The sealing member 6 was made of pure teflon. A coating film was formed on only the upper part of the surface of the shaft portion 5a opposite to the sealing member 6.

(6) Comparative example 1: Both the shaft portion 5a and the sealing member 6 were left untreated.

(7) Comparative example 2: A silicon-based oil repelling agent (spray type) was used, and a coating film was formed on the entire surface of the sealing member 6. A coating film was also formed on only the surface of the shaft portion 5a opposite to the sealing member 6.

The test was conducted for each of the examples (1) to (7), wherein the atmosphere was 60° C.; the shaft diameter of the shaft portion 5a was φ 3; the shaft was placed in a vertical position, with its sealing-portion side pointing downward; the number of revolutions was 4200 rpm; the driving method was a repeated ON/OFF operation (ON for 10 minutes and OFF for 10 minutes); the duration was 3000 hours; and evaluation was made with respect to an oil leakage condition and the change of performance (shaft vibration and current values). Note that an unbalanced load of 0.1 g·cm was given.

The following is a summary of the materials used for the examples and comparative examples.

(1) Sealing member 6:
   free-cutting brass (JIS C3604BD) for the examples 1, 2, 3, and 4 and the comparative examples 1 and 2; and pure teflon for the example 5

(2) Shaft portion 5a:
   SUS materials (JIS SUS420J2) for all of the examples and comparative examples (3) Fluorine-containing polymer and compounding agents:
   No. 1. a polyfluoroalkyl polymer containing an epoxy group
   No. 2. a polyfluoroalkyl polymer containing an amino group No. 3. a polyfluoroalkyl polymer containing a hydroxyl group No. 4. a fluoropolyether polymer containing an isocyanate group (average molecular weight: about 2,000) (Trade Name: Fonblin Z-DISOC, manufactured by Ausimont Corp.)

No. 5. a fluoropolyether polymer containing a hydroxyl group (average molecular weight: about 2,000) (Trade Name: Fonblin Z-DOL, manufactured by Ausimont Corp.)

No. 6. an isocyanate compound (the average value of n: 0.6)

Chemical Formulas of No.1 to 6 are described above.

Note that the polymer of No.4 was used as the fluorine-containing polymer.

After manufacturing all of the examples and comparative examples, they were subjected to ultrasonic cleaning with n-hexane for 30 seconds. For the examples 1 to 4, a solution for a coating film was prepared by diluting the above stated fluorine polymer and a compounding agent with a solvent (Vertrel XF, manufactured by Mitsui DuPont Phlorochemical K.K.) to a concentration of 1% by weight. Then, the solution thus obtained was applied to the shaft portion 5a and the sealing member 6.

After completion of the application and drying process, heating treatment was conducted at 120° C. for 3 hours, whereby a coating film approximately 0.2 to 0.3 $\mu$m thick was obtained. In the comparative example 1, the sealing member and the shaft portion were constructed basically in the same manner as those of the practical example 1 except that, in the former, no thin layer of the fluorine-containing polymer was formed. Moreover, in the comparative example 2, a commercially available silicone-based water repelling agent was applied to the sealing member and the shaft portion using a spray, and subsequently the components were dried at ordinary temperatures. Note that, in the comparative example 2, a coating film was formed on the entire surface of the shaft portion, but as a result the film thickness was greater than 10 $\mu$m. This made it impossible to secure the radial bearing gap R1 and thus insert the shaft portion 5a into the bearing member 4.

The results of the test will be described below.

As for the examples 1 to 5, the operation has been performed without any problem for 3000 hours, and, as shown in the tables (1) and (2) below, both the shaft vibration and current values were found to be much the same as those observed in the initial state. Note that, observation was made after completion of the test, and it was confirmed that plenty of oil remained within the bearing member 4, that no oil was leaked to the outside of the housing, and that the oil-wettability of the shaft portion 5a and the sealing member 6 changed little.

|  | Initial state | 3000 hours later |
|---|---|---|
| (1) Shaft vibration ($\mu$m) | | |
| Example 1 | 1.2 | 1.3 |
| Example 2 | 1.3 | 1.3 |
| Example 3 | 0.9 | 1.5 |
| Example 4 | 0.8 | 1.1 |
| Example 5 | 1.5 | 1.5 |
| (2) Current values (mA) | | |
| Example 1 | 65.3 | 63.1 |
| Example 2 | 66.7 | 65.8 |

-continued

|  | Initial state | 3000 hours later |
|---|---|---|
| Example 3 | 64.8 | 62.2 |
| Example 4 | 68.2 | 66.9 |
| Example 5 | 65.1 | 64.8 |

As for the comparative example 1, after the test was started, a decrease in the current value was recognized about 10 days later (64.7 mA at the initial state→60.8 mA), and an increase in the current value was recognized about 15 days later (60.8 mA→77.2 mA). Then, shaft vibration was measured and it was found that the value of the shaft vibration observed at the initial state: 2 $\mu$m was increased to 10 $\mu$m. Then, observation was made after the removal of the rotor (shaft), and it was confirmed that the inner part of the bearing member did not get wet with oil and that the periphery of the motor got wet with scattered oil.

As for the comparative example 2, the operation could be performed without any problem for about 1000 hours, but thereafter the current value was gradually increased, and the shaft vibration was also found to be increased at the measurement made about 1200 hours later (shaft vibration: 1.7 $\mu$m at the initial state→8 $\mu$m 1200 hours later; and current value: 65.5 mA at the initial state→81.1 mA 1200 hours later). Then, observation was made after suspension of the test, and it was confirmed that the inner part of the bearing member did not get wet with oil and that the periphery of the motor got wet with scattered oil. Moreover, the oil-wettabilities of the shaft portion and the sealing member were deteriorated to be substantially equal to those of untreated components. This is probably because the oil repelling capability observed at the initial state yielded to the oil supplied during the test, or the coating film was dissolved in the oil. Accordingly, it was confirmed that a material of room temperature setting type was useless because of its poor durability.

As described heretofore, according to the present invention, oil leakage can be successfully prevented without fail in a simple construction regardless of the position of the shaft. This makes it possible to provide an inexpensive, high-performance bearing unit. Moreover, the bearing is free from oil leakage and is thus capable of maintaining an oil film for a sufficiently long period of time, thereby significantly improving the durability. In addition, it never occurs that the periphery is contaminated due to oil leakage.

What is claimed is:

1. A hydrodynamic oil-impregnated sintered bearing unit comprising:

a hydrodynamic oil-impregnated sintered bearing made of a sintered metal and composed of a bearing body having a radial bearing surface opposed via a bearing gap to an outer circumferential surface of a shaft, the bearing body being impregnated with a lubricating oil or lubricating grease, the hydrodynamicoil-impregnated sintered bearing non-contactingly supporting the shaft by exploiting a dynamic pressure effect generated by a relative rotation between the shaft and the bearing body;

a housing with its one end opened and its other end closed, the housing having in its inner diameter portion said hydrodynamic oil-impregnated sintered bearing;

and a thrust bearing portion for thrust-supporting the shaft, the bearing unit characterized in that a sealing washer made of a metal or resin material is arranged on an opening-portion side of the housing, and that, of a surface of the sealing washer, at least on an inner circumferential surface opposite to the shaft a thin layer of a fluorine-containing polymer is formed.

2. A hydrodynamic oil-impregnated sintered bearing unit comprising:

a hydrodynamic oil-impregnated sintered bearing made of a sintered metal and composed of a bearing body having a radial bearing surface opposed via a bearing gap to an outer circumferential surface of a shaft, the bearing body being impregnated with a lubricating oil or lubricating grease, the hydrodynamic oil-impregnated sintered bearing non-contactingly supporting the shaft by exploiting a dynamic pressure effect generated by a relative rotation between the shaft and the bearing body;

a housing with its one end opened and its other end closed, the housing having in its inner diameter portion said hydrodynamic oil-impregnated sintered bearing;

and a thrust bearing portion for thrust-supporting the shaft, the bearing unit characterized in that a sealing washer made of a metal or resin material is arranged on an opening-portion side of the housing, and that, of a surface of the shaft, at least on a region including a portion opposite to the sealing washer a thin layer of a fluorine-containing polymer is formed.

3. A hydrodynamic oil-impregnated sintered bearing unit comprising:

a hydrodynamic oil-impregnated sintered bearing made of a sintered metal and composed of a bearing body having a radial bearing surface opposed via a bearing gap to an outer circumferential surface of a shaft, the bearing body being impregnated with a lubricating oil or lubricating grease, the hydrodynamic oil-impregnated sintered bearing non-contactingly supporting the shaft by exploiting a dynamic pressure effect generated by a relative rotation between the shaft and the bearing body;

a housing with its one end opened and its other end closed, the housing having in its inner diameter portion said hydrodynamic oil-impregnated sintered bearing;

and a thrust bearing portion for thrust-supporting the shaft, the bearing unit characterized in that a sealing washer made of a metal or resin material is arranged on an opening-portion side of the housing, and that, of a surface of the sealing washer, at least on an inner circumferential surface opposite to the shaft, and, of a surface of the shaft, at least on a region including a portion opposite to the sealing washer, thin layers of a fluorine-containing polymer are formed.

4. A hydrodynamic oil-impregnated sintered bearing unit comprising:

a hydrodynamic oil-impregnated sintered bearing made of a sintered metal and composed of a bearing body having a radial bearing surface opposed via a bearing gap to an outer circumferential surface of a shaft, the bearing body being impregnated with a lubricating oil or lubricating grease, the hydrodynamic oil-impregnated sintered bearing non-contactingly supporting the shaft by exploiting a dynamic pressure effect generated by a relative rotation between the shaft and the bearing body;

a housing with its one end opened and its other end closed, the housing having in its inner diameter portion said hydrodynamic oil-impregnated sintered bearing;

and a thrust bearing portion for thrust-supporting the shaft, the bearing unit characterized in that a sealing washer made of a metal or resin material is arranged on an opening-portion side of the housing, and that, of a surface of the sealing washer, at least on a top surface a thin layer of a fluorine-containing polymer is formed.

5. A hydrodynamic oil-impregnated sintered bearing unit comprising:

a hydrodynamic oil-impregnated sintered bearing made of a sintered metal and composed of a bearing body having a radial bearing surface opposed via a bearing gap to an outer circumferential surface of a shaft, the bearing body being impregnated with a lubricating oil or lubricating grease, the hydrodynamic oil-impregnated sintered bearing non-contactingly supporting the shaft by exploiting a dynamic pressure effect generated by a relative rotation between the shaft and the bearing body;

a housing with its one end opened and its other end closed, the housing having in its inner diameter portion said hydrodynamic oil-impregnated sintered bearing;

and a thrust bearing portion for thrust-supporting the shaft, the bearing unit characterized in that a sealing washer made of a metal or resin material is arranged on an opening-portion side of the housing, and that, of a surface of the shaft, at least on an upper part of a region opposite to an inner surface of the sealing washer a thin layer of a fluorine-containing polymer is formed.

6. A hydrodynamic oil-impregnated sintered bearing unit comprising:

a hydrodynamic oil-impregnated sintered bearing made of a sintered metal and composed of a bearing body having a radial bearing surface opposed via a bearing gap to an outer circumferential surface of a shaft, the bearing body being impregnated with a lubricating oil or lubricating grease, the hydrodynamicoil-impregnated sintered bearing non-contactingly supporting the shaft by exploiting a dynamic pressure effect generated by a relative rotation between the shaft and the bearing body;

a housing with its one end opened and its other end closed, the housing having in its inner diameter portion said hydrodynamic oil-impregnated sintered bearing;

and a thrust bearing portion for thrust-supporting the shaft, the bearing unit characterized in that a sealing washer made of a metal or resin material is arranged on an opening-portion side of the housing, and that, of a surface of the sealing washer, at least on a top surface of the sealing washer, and, of a surface of the shaft, at least on an upper part of a region opposite to an inner surface of the sealing washer, thin layers of a fluorine-containing polymer are formed.

7. The hydrodynamic oil-impregnated sintered bearing unit according to any of claims 1 to 6, wherein the sealing washer is made of a material in which a contact angle between the material and a lubricating oil to be used is 20° or above, or is subjected to surface treatment to obtain the same effect.

8. The hydrodynamic oil-impregnated sintered bearing unit according to any of claims 1 to 6, wherein a gap between the shaft and the sealing washer is set at 0.1 mm or below.

9. The hydrodynamic oil-impregnated sintered bearing unit according to any of claims 1 to 6, wherein a dynamic-pressure groove inclined with respect to an axial direction is formed on said radial bearing surface.

10. The hydrodynamic oil-impregnated sintered bearing unit according to any of claims 1 to 6, wherein a ventilating path opening into both end portions of the bearing body is formed between the outer circumferential surface of the bearing body and the inner circumferential surface of the housing.

11. An optical disc drive spindle motor comprising:
the hydrodynamic oil-impregnated sintered bearing unit as recited in any of claims 1 to 6 for rotating an optical disc by exploiting a relative rotation between the shaft and the bearing body.

12. A magnetic disc drive spindle motor comprising:
the hydrodynamic oil-impregnated sintered bearing unit as recited in any of claims 1 to 6 for rotating a magnetic disc by exploiting a relative rotation between the shaft and the bearing body.

13. A polygon scanner motor comprising:
the hydrodynamic oil-impregnated sintered bearing unit as recited in any of claims 1 to 6 for rotating a polygon mirror by exploiting a relative rotation between the shaft and the bearing body.

14. A hydrodynamic oil-impregnated sintered bearing unit comprising:
a rotary shaft body having in a bottom-end portion of its shaft portion a flange portion;
a housing portion formed into a sleeve with a bottom having at its one end an opening portion, the housing portion having a thrust bearing gap interposed between its bottom surface and a bottom-end surface of the flange portion;
a bearing member having a radial bearing gap interposed in an outer diameter surface of said shaft portion and having a thrust bearing gap interposed between an end surface of the flange portion and an opposite end surface, the bearing member being housed in said housing portion;
and a sealing member arranged on an opening-portion side of said housing portion and having a through portion into which said shaft portion is inserted, wherein said bearing member is composed of a sintered metal in which a lubricating oil or lubricating grease is impregnated, and said bearing member is constructed such that a dynamic pressure is generated in said thrust bearing gap and said radial bearing gap, the bearing unit characterized in that, of a surface of the sealing member, at least on a top surface a coating film of a fluorine-containing polymer is formed.

15. A hydrodynamic oil-impregnated sintered bearing unit comprising:
a rotary shaft body having in a bottom-end portion of its shaft portion a flange portion;
a housing portion formed into a sleeve with a bottom having at its one end an opening portion, the housing portion having a thrust bearing gap interposed between its bottom surface and a bottom-end surface of the flange portion;
a bearing member having a radial bearing gap interposed in an outer diameter surface of said shaft portion and having a thrust bearing gap interposed between an end surface of the flange portion and an opposite end surface, the bearing member being housed in said housing portion;
and a sealing member arranged on an opening-portion side of said housing portion and having a through portion into which said shaft portion is inserted, wherein said bearing member is composed of a sintered metal in which a lubricating oil or lubricating grease is impregnated, and said bearing member is constructed such that a dynamic pressure is generated in said thrust bearing gap and said radial bearing gap, the bearing unit characterized in that, of a surface of said shaft portion, at least on an upper part of an outer diameter region opposite to the through hole, a coating film of a fluorine-containing polymer is formed.

16. A hydrodynamic oil-impregnated sintered bearing unit comprising:
a rotary shaft body having in a bottom-end portion of its shaft portion a flange portion;
a housing portion formed into a sleeve with a bottom having at its one end an opening portion, the housing portion having a thrust bearing gap interposed between its bottom surface and a bottom-end surface of the flange portion;
a bearing member having a radial bearing gap interposed in an outer diameter surface of said shaft portion and having a thrust bearing gap interposed between an end surface of the flange portion and an opposite end surface, the bearing member being housed in said housing portion;
and a sealing member arranged on an opening-portion side of said housing portion and having a through portion into which said shaft portion is inserted, wherein said bearing member is composed of a sintered metal in which a lubricating oil or lubricating grease is impregnated, and said bearing member is constructed such that a dynamic pressure is generated in said thrust bearing gap and said radial bearing gap, the bearing unit characterized in that, at least on a top surface of a surface of the sealing member, and at least on an upper part of an outer diameter region of a surface of said shaft portion opposite to the through hole, coating films of a fluorine-containing polymer are formed.

17. The hydrodynamic oil-impregnated sintered bearing unit according to any of claims 14 to 16, wherein said sealing member is made of a metal or resin material.

18. The hydrodynamic oil-impregnated sintered bearing unit according to any of claims 14 to 16, wherein said sealing member is made of a material in which a contact angle between the material and a lubricating oil to be used is 20° or above, or is subjected to surface treatment to obtain the same effect.

19. The hydrodynamic oil-impregnated sintered bearing unit according to any of claims 14 to 16, wherein a gap between an inner diameter surface of said sealing member and an outer diameter surface of said shaft portion is set at 0.1 mm or below.

20. The hydrodynamic oil-impregnated sintered bearing unit according to any of claims 14 to 16, wherein, as means for generating a dynamic pressure in said radial bearing gap, a dynamic-pressure groove inclined with respect to an axial direction is formed on a radial bearing surface.

21. The hydrodynamic oil-impregnated sintered bearing unit according to any of claims 14 to 16, wherein, as means for generating a dynamic pressure in said thrust bearing gap, a dynamic-pressure groove inclined with respect to a radial direction is formed on a thrust bearing surface.

22. The hydrodynamic oil-impregnated sintered bearing unit according to any of claims 14 to 16, wherein a ventilating path is formed between an outer diameter surface of said bearing member and an inner diameter surface of said housing portion, the ventilating path opening into both axial end portions of the bearing member.

23. The hydrodynamic oil-impregnated sintered bearing unit according to any of claims 14 to 16, wherein the bearing unit is incorporated into a disc-driving spindle motor for use with information equipment.

* * * * *